Figure 1:
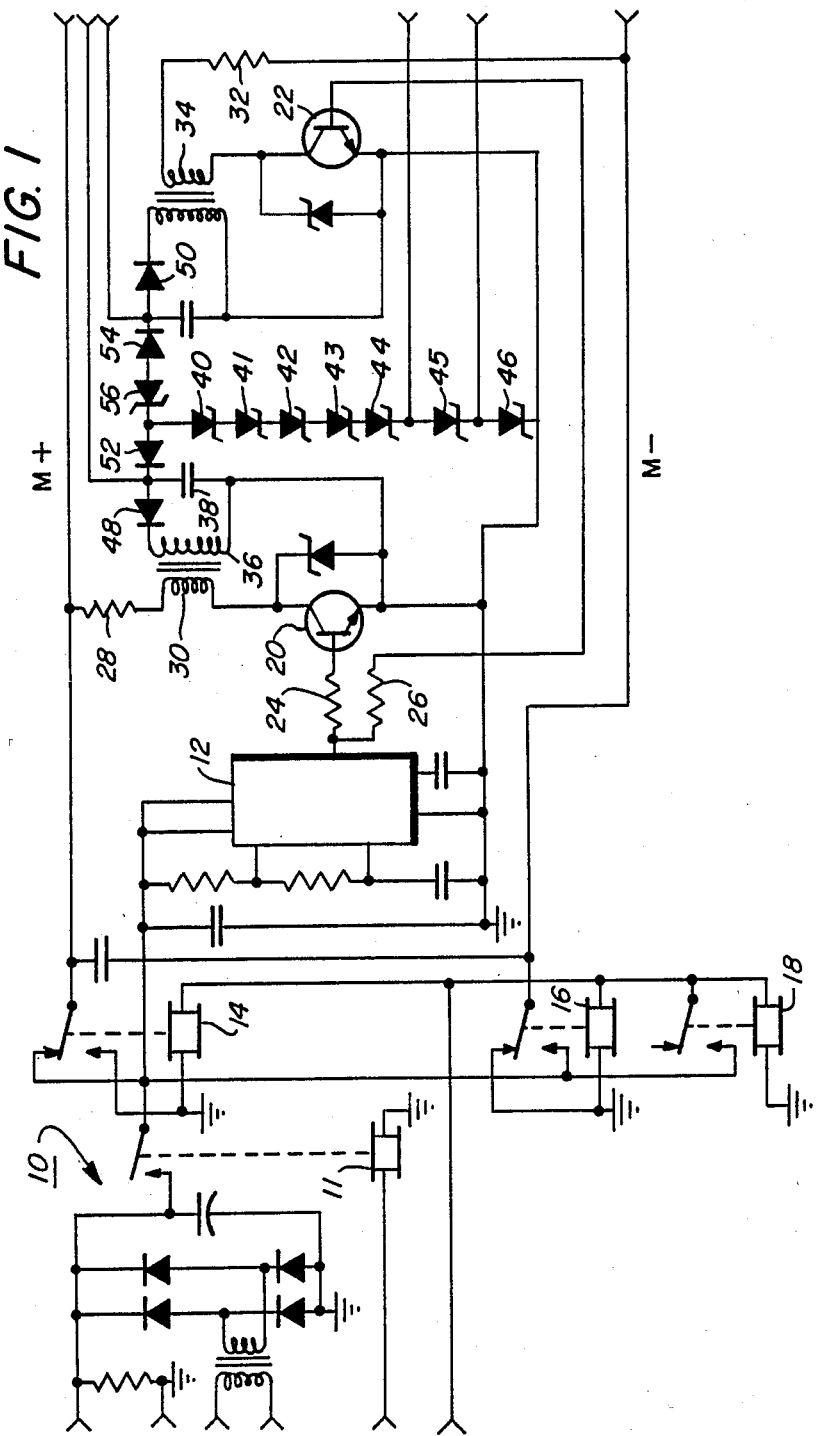

United States Patent [19]

Lawson, Jr.

[11] Patent Number: 4,580,206

[45] Date of Patent: Apr. 1, 1986

[54] VOLTAGE CLAMP REGULATOR

[75] Inventor: Harry W. Lawson, Jr., Rush, N.Y.

[73] Assignee: Xerox Corporation, Stamford, Conn.

[21] Appl. No.: 517,609

[22] Filed: Jul. 27, 1983

[51] Int. Cl.⁴ .............................................. G05F 3/18
[52] U.S. Cl. ................................... 363/126; 307/566;
323/231; 361/56; 361/91
[58] Field of Search ...................... 363/20, 21, 70, 71,
363/22, 66, 67, 126; 323/231, 229, 271, 272;
307/566; 361/56, 91

[56] References Cited

U.S. PATENT DOCUMENTS

| 1,883,613 | 10/1932 | Devol | 323/229 |
| 2,984,780 | 5/1981 | Koletsky | 323/66 |
| 3,091,729 | 5/1963 | Schmidt | 321/5 |
| 3,328,664 | 1/1967 | Baude | 321/11 |
| 3,430,127 | 2/1969 | Weiss | 323/66 |
| 4,162,525 | 7/1979 | Epp | 363/71 |
| 4,236,198 | 11/1980 | Ohsawa et al. | 363/49 |
| 4,386,311 | 5/1983 | Bafaro | 323/271 |
| 4,459,498 | 7/1984 | Stengl et al. | 307/566 |

FOREIGN PATENT DOCUMENTS

| 1934223 | 1/1971 | Fed. Rep. of Germany | 323/231 |
| 4525947 | 7/1965 | Japan | 323/231 |
| 2077466 | 12/1981 | United Kingdom | 323/229 |

Primary Examiner—Patrick R. Salce
Assistant Examiner—D. L. Rebsch
Attorney, Agent, or Firm—Ronald F. Chapuran

[57] ABSTRACT

A 12 volt input is supplied to a timer providing a square wave output with an approximately 50% duty cycle. The output is applied to the bases of a pair of transistors and the collectors of the transistors conduct when a drive motor is in either the forward direction or the reverse direction. During the time that a particular transistor is conducting, its collector current rises to a point of cutoff. At this time, energy stored in a transformer circuit is released to the secondary of the transformer circuit. To regulate the increase in voltage in the secondary, diode clamping is accomplished by a common string of zener diodes connected to the output of the secondaries of the transformer circuits and to the emitters of the transistors. By adding additional zener diodes in the secondary circuits of either of the transformer circuits, a change in the high voltage output for that particular transformer is accomplished.

8 Claims, 2 Drawing Figures

VOLTAGE CLAMP REGULATOR

This invention relates to a high voltage power supply, and in particular to a power supply that can be switched from one high voltage level to another high voltage level.

Various voltage regulator and power supply system are shown in the prior art. For example, U.S. Pat. No. 3,328,664 discloses a power inverter circuit powered by a correct current source having two transistors in a push/pull arrangement controlled by a signal from the center tap input transformer alternately turning on the transistors. U.S. Pat. No. 4,162,525 teaches a power system having the feature of a diode across the emitter collector terminals of a transistor and U.S. Pat. Nos. 2,984,780; 3,091,729 and 3,430,127 disclose circuits showing the use of zener diodes connected in series and used for voltage regulation.

In addition, U.S. Pat. No. 3,430,127 teaches a string of zener diodes in a switching system. U.S. Pat. No. 3,328,664 teaches a protection circuit for transistors; U.S. Pat. No. 4,162,525 discloses protection of an inverter in a system utilizing power in both directions, and U.S. Pat. No. 4,236,198 discloses a pulse width switching regulator.

A difficulty with the prior art systems is that they are relatively expensive and complex and do not provide the means to readily adapt the high voltage output in a power supply to various high voltage levels.

It is an object of the present invention, therefore, to provide a new and improved high voltage power supply. It is another object of the present invention to provide a high voltage power supply that is simple and inexpensive and provides a relatively simple means to switch and regulate various high voltage power levels. Further advantages of the present invention will become apparent as the following description proceeds and the features characterizing the invention will be pointed out with particularity in the claims annexed to and forming a part of this specification.

Briefly, a 12 volt input is supplied to a timer providing a square wave output with an approximately 50% duty cycle. The output is applied to the base of a pair of transistors, and the collectors of the transistors conduct when a drive motor is in either the forward direction or the reverse direction. During the time that a particular transistor is conducting, its collector current rises to a point of cut off. At this time energy stored in a transformer circuit is released to the secondary of the transformer circuit. To regulate the increase in voltage in the secondary, diode clamping is accomplished by a common string of zener diodes connected to the output of the secondaries of the transformer circuits and to the emitters of the transistors. By adding additional zener diodes in the secondary circuits of either of the transformer circuits, a change in the high voltage output for that particular transformer is accomplished.

Figure 2:
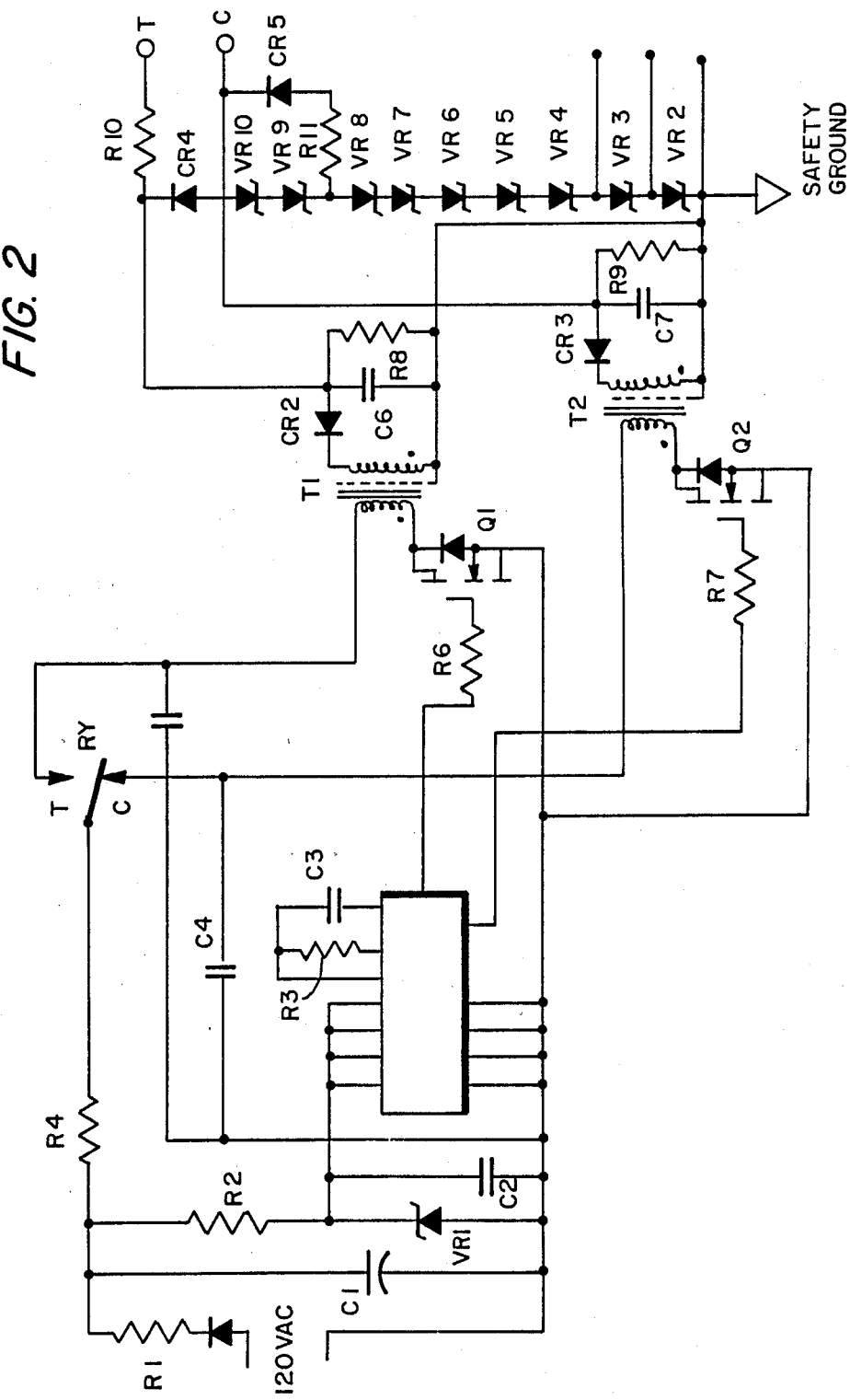

Other objects and advantages of the present invention will become apparent upon reading the following detailed description and upon reference to the drawings in which:

FIG. 1 is a schematic of a high voltage power supply in accordance with the present invention; and FIG. 2 is another embodiment of a high voltage power supply in accordance with the present invention.

With reference, to FIG. 1, a 115 volt ac to 12 volt dc supply is generally shown at 10, comprising a transformer, full wave bridge rectifier, and capacitor filter. The 12 volts dc is applied from the main power relay 11 to timer chip 12 operating at approximately 12 kilohertz in an astable mode with close to a 50% duty cycle. Preferably, the timer chip 12 is any suitable timer such as a "555" chip providing square wave pulses. Reversing relays 14, 16 and 18 are provided to switch the 12 volts to either transistor 20 or transistor 22.

The output of the timer 12 is applied through resistor 24 to the base of transistor 20 and through resistor 26 to the base of transistor 22. The collector of transistor 20 operates from +12 volts via resistor 28 and the transformer primary winding 30 when a not shown drive motor connected at M+ and M— is in the forward direction of rotation, and the transistor 22 operates via resistor 32 and transformer primary winding 34 when the drive motor is in the reverse direction.

During the on time of the specific transistor activated by the motor, for example transistor 20 when the motor is in the forward direction, the transistor 20 collector current rises linearly from 0 to approximately 500 milliamps. In particular, with positive pulses at the output of the timer 12 to transistor 20, transistor 20 conducts. After the collector current reaches approximately 500 milliamps, the transistor 20 is cut off, and stored energy, equal to $\frac{1}{2} LI^2$, is released to the secondary winding 36 and charges the capacitor 38. (The power in watts delivered to the transformer is $\frac{1}{2} LI^2 \times f$ where f is the frequency of operation).

The flyback positive going pulse that appears on the transistor 20 collector when the transistor is shut off appears on the secondary winding 36, modified by the transformer turns ratio. The collector voltage, however, could rise to destructive proportions if there were nothing to hold the voltage back. One method of clamping the voltage is to connect a zener diode across the collector emitter junctions of each of the transistors 20 and 22 to clamp the voltage at an appropriate level. This method may not regulate very well, however, because it does not account for transformer secondary winding resistance.

According to the present invention, voltage clamping is preferably accomplished at the secondary. With reference to FIG. 1, a common string of zener diodes 40 through 46 provide a common clamping for alternative voltage outputs. In addition, high speed, high voltage rectifier diodes 48 and 50 are provided, and the rectifier diodes 52 and 54 are normal high voltage diodes used in a high level OR circuit connected to the common zener string 40 through 46. In a preferred embodiment, the output from the capacitor 38 is −1300 volts using the diodes 40 through 46 and 52 as a voltage clamp. By adding an additional diode 56, the output from the capacitor 58 is −1400 volts using the common diodes 40 through 46 and diodes 54 and 56 as a voltage clamp. Since the diode string 40 through 46 current is on the order of 400 to 500 microamps, load regulation is extremely favorable. This also enables the juggling of diodes to provide a desired voltage. Resistors 28 and 32 are current limiting resistors, preferably one watt in size, that can handle short term, output short circuit conditions for several minutes.

A typical application for the power supply shown in FIG. 1 is to provide high voltages in an electrostatic reproduction machine. One of the high voltage outputs can be used for charging of the photoreceptor and another of the high voltage outputs can be used for detack in the transfer of a latent image on the photoreceptor to a copy sheet. It should be noted that even though a slight increase in output voltage with time is experienced with high voltage zeners, the total common zener string increase should be less than 30 volts.

With reference to FIG. 2, there is illustrated another embodiment of the high voltage power supply in accordance with the present invention. The basic mechanism of FIG. 2 is the same as FIG. 1 except that the source is 120 VAC at 50/60 Hertz and all the devices are MOS.

While there has been illustrated and described what is at present considered to be a preferred embodiment of the present invention, it will be appreciated that numerous changes and modifications are likely to occur to those skilled in the art, and it is intended in the appended claims to cover all those changes and modifications which fall within the true spirit and scope of the present invention.

What is claimed is:

1. A high voltage power supply comprising
   a timer providing a generally square wave output,
   first and second transistors, the bases of the transistors connected to the timer output,
   a first transformer circuit providing a first high voltage level output, one end of the first transformer circuit connected to the collector of the first transistor,
   a second transformer circuit providing a second high voltage level output, one end of the second transformer circuit connected to the collector of the second transistor, and
   a common diode string, said common diode string connected to the first and second high voltage level outputs and to the emitters of the first and second transistors to clamp the energy in one of the transformer circuits whereby regulated first and second high level voltages are provided.

2. The power supply of claim 1 wherein the common diode string is a string of zener diodes.

3. The power supply of claim 1 wherein the first high level voltage output is approximately 1300 volts and the second high level voltage output is approximately 1400 volts.

4. The power supply of claim 1 including a 12 volt source and a switch, the switch providing 12 volts to either the first transistor or the second transistor.

5. The power supply of claim 4 wherein the primary of the first transformer circuit interconnects the switch and the collector of the first transformer and the primary of the second transformer circuit interconnects the switch with the collector of the second transformer circuit.

6. The power supply of claim 1 wherein one end of the diode string is connected to the output of the secondary windings of the first and second transformer circuits and the other end of the diode string is connected to the emitters of the first and second transistors.

7. A high voltage power supply comprising
   a timer providing a generally square wave output,
   first and second transistors, the bases of the transistors connected to the timer output,
   a first transformer circuit providing a first high voltage level output, one end of the first transformer circuit connected to the collector of the first transistor,
   a second transformer circuit providing a second high voltage level output, one end of the second transformer circuit connected to the collector of the second transistor,
   a common zener diode string, wherein one end of the diode string is connected to the output of the secondary windings of the first and second transformer circuits and the other end of the diode string is connected to the emitters of the first and second transistors, first and second high voltage level outputs and to the collectors of the first and second transistors to clamp the energy in one of the transformer circuits, and
   a 12 volt source and a switch, the switch providing the dc voltage to either the first or second transistor.

8. The power supply of claim 7 wherein the primary of the first transformer circuit interconnects the switch and the collector of the first transformer and the primary of the second transformer circuit interconnects the switch with the collector of the second transformer circuit.

* * * * *